United States Patent
Klestadt

(10) Patent No.: US 11,353,304 B2
(45) Date of Patent: Jun. 7, 2022

(54) SAFE BOOSTER JETTISON FOR TACTICAL MISSILES

(71) Applicant: Raytheon Company, Waltham, MA (US)

(72) Inventor: Ralph H. Klestadt, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 164 days.

(21) Appl. No.: 16/996,455

(22) Filed: Aug. 18, 2020

(65) Prior Publication Data

US 2022/0057182 A1 Feb. 24, 2022

(51) Int. Cl.
| F42B 15/10 | (2006.01) |
| F42B 15/01 | (2006.01) |
| F42B 15/08 | (2006.01) |
| F42B 15/36 | (2006.01) |
| F42B 15/00 | (2006.01) |

(52) U.S. Cl.
CPC ............ F42B 15/105 (2013.01); F42B 15/01 (2013.01); F42B 15/08 (2013.01); F42B 15/36 (2013.01)

(58) Field of Classification Search
CPC ........ F42B 15/105; F42B 15/01; F42B 15/08; F42B 15/36; F42B 10/64; B64G 1/62; B64G 1/645; B64G 1/002; B64G 1/14; B64G 1/40
See application file for complete search history.

(56) References Cited

U.S. PATENT DOCUMENTS

| 6,056,237 A | 5/2000 | Woodland |
| 6,450,452 B1 * | 9/2002 | Spencer ................. B64G 1/14 244/159.3 |
| 6,612,522 B1 | 9/2003 | Aldrin |
| 6,616,092 B1 | 9/2003 | Barnes |

(Continued)

FOREIGN PATENT DOCUMENTS

| CN | 106021628 A | 10/2016 |
| WO | 2008/088330 | 7/2008 |

OTHER PUBLICATIONS

International Search Report and Written Opinion dated Nov. 12, 2021, in corresponding International Application No. PCT/US2021/016717.

*Primary Examiner* — Bernarr E Gregory
(74) *Attorney, Agent, or Firm* — Renner, Otto, Boisselle & Sklar, LLP

(57) ABSTRACT

A missile including an upper stage and at least one lower stage is provided. The upper stage includes a primary flight computer configured to control a flight of the upper stage along a missile flight path such that, for example, it reaches a predetermined target. The lower stage is mounted to the upper stage and includes a propellant for initially propelling the upper stage along the missile flight path. The lower stage is configured to be jettisoned from the upper stage when the propellant is spent. The lower stage includes a secondary flight computer configured to receive data from the primary flight computer prior to the propellant of the lower stage being spent, and to control a flight of the lower stage along a jettisoned stage flight path of the jettisoned lower stage such that, for example, the jettisoned lower stage glides to a predetermined safe landing zone.

20 Claims, 3 Drawing Sheets

(56) References Cited

U.S. PATENT DOCUMENTS

| | | | | |
|---|---|---|---|---|
| 6,817,580 B2* | 11/2004 | Smith | ...................... | B64G 1/14 |
| | | | | 244/171.1 |
| 7,834,859 B2* | 11/2010 | Wainfan | ................... | B64G 1/14 |
| | | | | 244/158.9 |
| 8,844,876 B2* | 9/2014 | Prampolini | .............. | B64G 1/62 |
| | | | | 244/158.9 |
| 9,139,311 B2* | 9/2015 | Salkeld | .................... | B64G 1/14 |
| 9,174,749 B2* | 11/2015 | Prampolini | ............ | B64G 1/002 |
| 2014/0069289 A1 | 3/2014 | Harris | | |
| 2015/0246736 A1* | 9/2015 | Dula | ....................... | B64G 1/40 |
| | | | | 701/13 |
| 2017/0015441 A1 | 1/2017 | Otsuka | | |

* cited by examiner

SAFE BOOSTER JETTISON FOR TACTICAL MISSILES

TECHNICAL FIELD

The present invention relates generally to multi-stage surface-launched missiles and more particularly to multi-stage missile jettison of spent stages.

BACKGROUND

Surface-launched missiles typically have a limited range and are volume constrained. For certain applications, however, it is desirable for missiles to achieve greater ranges while maintaining a small, compact package. Therefore, designs often include multiple stages to achieve the required kinematic efficiency for surface-launched missiles. Typically, in multi-stage missiles, all stages prior to the final stage are jettisoned after they have completed operation. This jettison often results in debris falling to the ground along the flight path of the missile. In some applications, the launch point of the missile is behind the line of engagement, so this can result in debris from jettisoned stages falling on and causing damage to friendly troops, civilians, ships, vehicles, or other assets. This significant disadvantage discourages the use of multi-stage designs to obtain long ranges.

Prior solutions have focused on either returning completed stages to the ground for re-use or strategically tailoring the missile flight path such that jettisoned stages fall ballistically to a desired location. Both of these solutions, however, have significant disadvantages in that significant payload weight is consumed by the associated hardware required to achieve a controlled landing and in that the overall performance of the mission typically suffers. Specifically, the range performance typically degrades as a result of the energy consumed to achieve a compromise between where the completed stages will fall and where the uncompleted stages must go.

SUMMARY

In a general embodiment, a multi-stage missile includes an upper stage and a lower stage. The upper stage is configured to fly along a missile flight path and reach a predetermined target, and the at least one lower stage is configured to initially propel the upper stage along at least a portion of the missile flight before being jettisoned therefrom when, for example, a propellant of the at least one lower stage is spent. The upper stage includes a primary flight computer configured to control the missile flight path such that, for example, the upper stage reaches the predetermined target. The at least one lower stage includes a secondary flight computer, operably coupled to the primary flight computer, configured to receive data from the primary flight computer prior to the at least one lower stage being jettisoned from the upper stage. The secondary flight computer is configured to control a jettisoned stage flight path of the at least one jettisoned lower stage such that, for example, the at least one jettisoned lower stage glides aerodynamically to a predetermined safe landing zone, instead of falling ballistically to the ground and potentially impacting friendly troops, civilians, ships, vehicles, or other assets.

According to an aspect of the invention, a missile includes an upper stage including a primary flight computer configured to control a flight of the upper stage along a missile flight path such that, for example, the upper stage reaches a predetermined target. The missile also includes at least one lower stage mounted to the upper stage. The at least one lower stage may include a propellant for initially propelling the upper stage along at least a portion of the missile flight path. The at least one lower stage is configured to be jettisoned from the upper stage when, for example, the propellant of the at least one lower stage is spent. The at least one lower stage further includes a secondary flight computer configured to receive data from the primary flight computer prior to the at least one lower stage being jettisoned, and to control a flight of the at least one jettisoned lower stage along a jettisoned stage flight path of the at least one jettisoned lower stage such that, for example, the at least one jettisoned lower stage glides aerodynamically to a predetermined safe landing zone.

According to an embodiment of any paragraph(s) of this summary, the upper stage further includes a first inertial measurement unit configured to collect missile flight data associated with the upper stage during flight and send the missile flight data to the primary flight computer for controlling the flight of the upper stage along the missile flight path such that, for example, the upper stage reaches the predetermined target.

According to another embodiment of any paragraph(s) of this summary, the at least one lower stage further includes a second inertial measurement unit configured to collect jettisoned stage flight data associated with the at least one jettisoned lower stage during flight. The second inertial measurement unit is configured to send the jettisoned stage flight data to the secondary flight computer for controlling the flight of the at least one jettisoned lower stage along the jettisoned stage flight path of the at least one jettisoned lower stage such that, for example, the at least one jettisoned lower stage glides aerodynamically to the predetermined safe landing zone.

According to another embodiment of any paragraph(s) of this summary, the second inertial measurement unit is independent of the first inertial measurement unit.

According to another embodiment of any paragraph(s) of this summary, the second inertial measurement unit is a minimum capability inertial measurement unit.

According to another embodiment of any paragraph(s) of this summary, the secondary flight computer is operably coupled to the primary flight computer.

According to another embodiment of any paragraph(s) of this summary, the secondary flight computer is a minimum capability flight computer.

According to another embodiment of any paragraph(s) of this summary, the at least one lower stage includes at least one moveable flight control surface.

According to another embodiment of any paragraph(s) of this summary, the at least one lower stage further includes a control actuation system. The control actuation system includes logic configured to receive at least one guidance command from at least one of the primary flight computer and the secondary flight computer and, in response to receipt of the at least one guidance command, control a position of the at least one movable flight control surface.

According to another embodiment of any paragraph(s) of this summary, the at least one moveable flight control surface is at least one fin.

According to another embodiment of any paragraph(s) of this summary, the at least one lower stage may also include a propellant and the at least one lower stage may be configured to be jettisoned from the upper stage when the propellant of the at least one lower stage is spent.

According to another embodiment of any paragraph(s) of this summary, the at least one lower stage further includes a power source.

According to another aspect of the invention, a method of operating a missile includes the step of launching the missile. The missile is configured to fly along a missile flight path to a predetermined target and includes an upper stage having a primary flight computer, and at least one lower stage mounted to the upper stage and having a secondary flight computer. The at least one lower stage may also have a propellant. The method also includes the step of initially propelling, via the at least one lower stage, for example with the propellant, the upper stage of the missile along at least a portion of the missile flight path. The method also includes the step of controlling, via the primary flight computer, a flight of the upper stage along the missile flight path such that, for example, the upper stage reaches the predetermined target. The method also includes the step of receiving, via the secondary flight computer, data from the primary flight computer prior to the at least one lower stage being jettisoned. The method also includes the step of jettisoning the at least one lower stage from the upper stage when the propellant of the at least one lower stage is spent. The method also includes the step of controlling, via the secondary flight computer, a flight of the at least one jettisoned lower stage along a jettisoned stage flight path of the at least one jettisoned lower stage such that, for example, the at least one jettisoned lower stage glides aerodynamically to a predetermined safe landing zone.

According to an embodiment of any paragraph(s) of this summary, the method further includes the step of collecting, via a first inertial measurement unit of the upper stage, missile flight data associated with the upper stage during flight and sending the missile flight data to the primary flight computer for controlling the flight of the upper stage along the missile flight path such that, for example, the upper stage reaches the predetermined target.

According to another embodiment of any paragraph(s) of this summary, the method further includes the step of collecting, via a second inertial measurement unit of the at least one lower stage, jettisoned stage flight data associated with the at least one jettisoned lower stage during flight and sending the jettisoned stage flight data to the secondary flight computer for controlling the flight of the at least one jettisoned lower stage along the jettisoned stage flight path of the at least one jettisoned lower stage such that, for example, the at least one jettisoned lower stage glides aerodynamically to the predetermined safe landing zone.

According to another embodiment of any paragraph(s) of this summary, the method further includes the step of receiving, via logic of a control actuation system of the at least one lower stage, at least one guidance command from at least one of the primary flight computer and the secondary flight computer. In response to receiving the at least one guidance command, the method also includes the step of controlling, via the control actuation system of the at least one lower stage, a position of the at least one movable flight control surface.

The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings show various aspects of the invention.

DETAILED DESCRIPTION

According to a general embodiment a multi-stage missile includes an upper stage configured to fly along a missile flight path and reach a predetermined target, and at least one lower stage configured to initially propel the upper stage along at least a portion of the missile flight path before being jettisoned therefrom when a propellant of the at least one lower stage is spent. The upper stage includes a primary flight computer configured to control the flight of the missile along the missile flight path such that, for example, the upper stage reaches the predetermined target. The at least one lower stage includes a secondary flight computer, operably coupled to the primary flight computer. In operation and during flight of the missile along the missile flight path, the secondary flight computer is configured to receive data from the primary flight computer prior to the at least one lower stage being jettisoned from the upper stage. Thereafter, for example, when the propellant of the at least one lower stage is spent and the at least one lower stage is jettisoned from the upper stage, the secondary flight computer is configured to control the flight of the at least one jettisoned lower stage along a jettisoned stage flight path of the at least one jettisoned lower stage such that, for example, the at least one jettisoned lower stage glides aerodynamically to a predetermined safe landing zone, instead of falling ballistically to the ground and potentially impacting friendly troops, civilians, ships, vehicles, or other assets.

Figure 1:
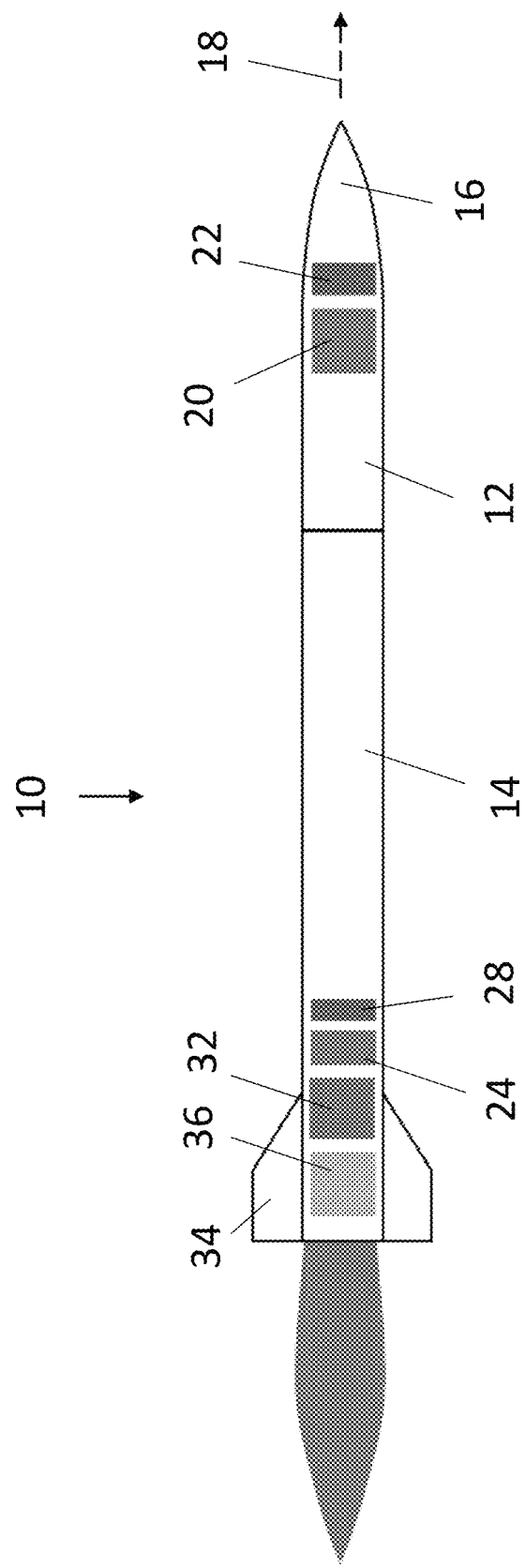
FIG. 1 is a schematic diagram of a multi-stage missile prior to at least one lower stage being jettisoned.

Referring now to the figures, and initially to FIG. 1, an exemplary embodiment is depicted of a multi-stage missile 10. The missile 10 includes an upper stage 12 and at least one lower stage 14. For applications requiring larger range, for example, the missile 10 may include more than one lower stage 14. For purposes of the present disclosure, a single lower stage 14 will be described, but it will be understood that the same principals and components described herein with respect to the single lower stage 14 will apply to each of more than one lower stage 14, as appropriate.

The upper stage 12 of the missile 10 may include a warhead 16. The missile 10 is configured to fly along a missile flight path 18 upon being launched to deliver the upper stage 12 and the warhead 16 to a predetermined target. The upper stage 12 of the missile 10 includes a primary flight computer 20 configured to control the flight of the upper stage 12 along missile flight path 18 to deliver the upper stage 12 and warhead 16 to the predetermined target.

The upper stage 12 of the missile 10 may include a first inertial measurement unit 22 configured to collect missile flight data associated with the upper stage 12 during flight along the missile flight path 18. For example, the missile flight data may include various geospatial and motion data of the upper stage 12 as it flies along the missile flight path 18. The first inertial measurement unit 22 is configured to send the missile flight data to the primary flight computer 20 for controlling the flight of the upper stage 12 along the missile flight path 18 such that, for example, the upper stage 12 reaches the predetermined target. The upper stage 12 may additionally include a power source for powering the operation of the components of the upper stage 12.

The at least one lower stage 14 of the missile 10 is initially mounted to the upper stage 12 of the missile 10, when launched, as depicted in FIG. 1. The at least one lower stage 14, when initially mounted to the upper stage 12, is configured to initially propel the missile 10 along at least a portion of the missile flight path 18. The at least one lower stage 14 therefore includes a propellant (not pictured) for initially propelling the missile 10. With additional reference to FIG. 2, once the propellant of the at least one lower stage 14 is spent, the missile 10 is configured to jettison the at least one lower stage 14 from the upper stage 12.

Figure 2:
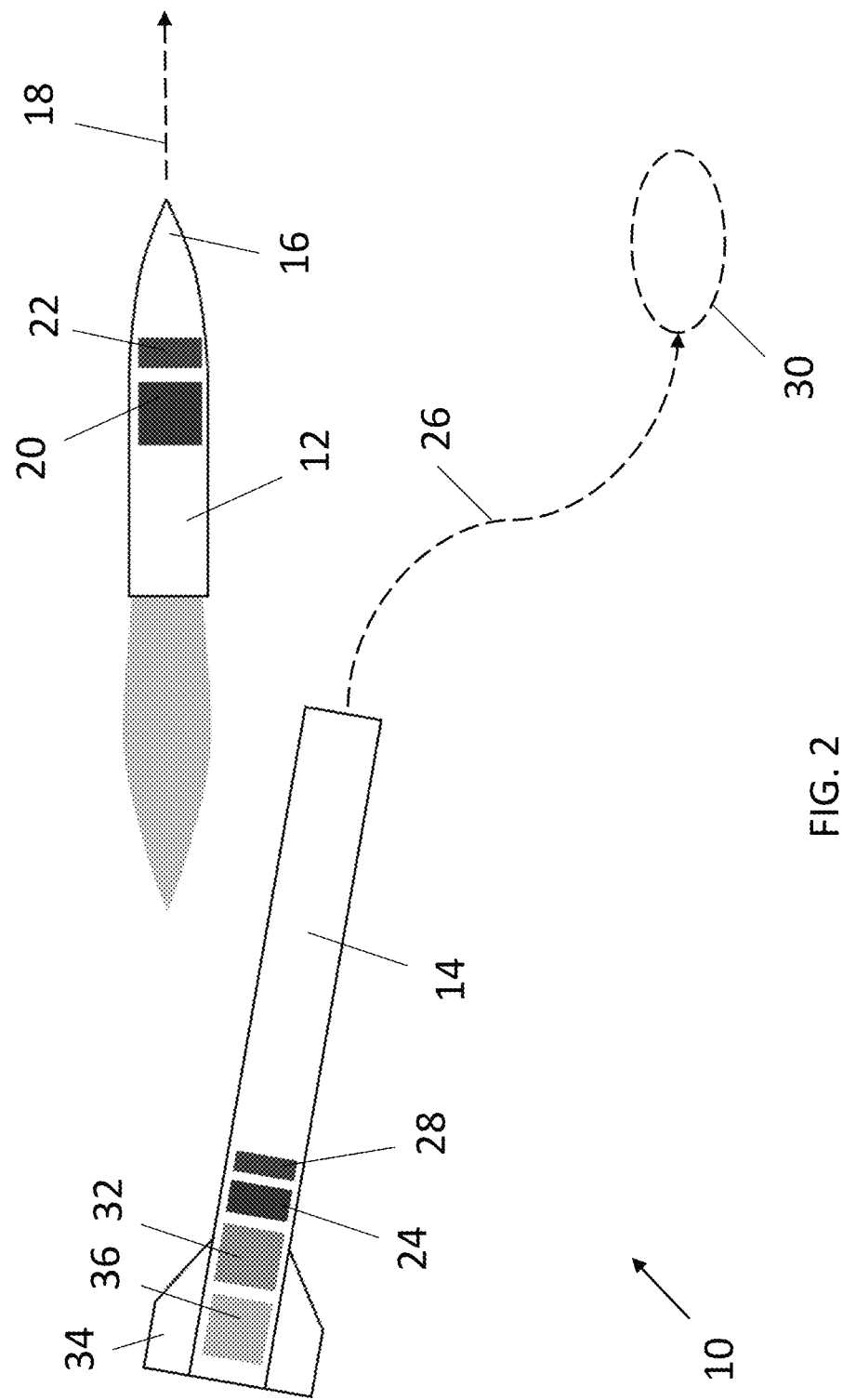
FIG. 2 is a schematic diagram of the multi-stage missile of FIG. 1, after the at least one lower stage has been jettisoned.

The at least one lower stage 14 includes a secondary flight computer 24, operably coupled to the primary flight computer 20. For example, the secondary flight computer 24 may be operably coupled, or connected, to the primary flight computer 20 by way of a wired or wireless connection, or by any alternative electronic means such that the secondary flight computer 24 is able to receive electronic data and information from the primary flight computer 20. The secondary flight computer 24 is therefore configured to receive data from the primary flight computer 20 prior to the at least one lower stage 14 being jettisoned from the upper stage 12. Such data may include, for example, geospatial and motion data associated with the missile 10, including both the upper stage 14 and the at least one lower stage 12, for example at the time when the propellant of the at least one lower stage 14 is spent and the at least one lower stage 14 is jettisoned from the upper stage 12 of the missile 10. The data may also include various control parameters of the primary flight computer 20 that are controlling the flight of the upper stage 12, and consequently also the at least one lower stage 14, along the missile flight path 18 at the time that the at least one lower stage 14 is jettisoned from the upper stage 12. This data, therefore, provides the secondary flight computer 24 of the at least one lower stage 14 a starting position in time and space for controlling the flight of the at least one jettisoned lower stage 14 along a jettisoned stage flight path 26 of the at least one lower stage 14 after it is jettisoned from the upper stage 12 (FIG. 2).

The at least one lower stage 14 may further include a second inertial measurement unit 28 configured to collect jettisoned stage flight data associated with the at least one jettisoned lower stage 14 during flight and send the jettisoned stage flight data to the secondary flight computer 24. For example, this jettisoned stage flight data may include various geospatial and motion data of the at least one lower stage 14 as it falls after it has been jettisoned from the upper stage 12. The secondary flight computer 24 is configured to use this data for controlling the flight of the at least one jettisoned lower stage 14 along the jettisoned stage flight path 26 such that, for example, the at least one jettisoned lower stage 14 glides aerodynamically and reaches the predetermined safe landing zone 30. The at least one lower stage 14 may additionally include a power source 32 for powering the operation of the components of the at least one lower stage 14.

The first inertial measurement unit 22 of the upper stage 12 and the second inertial measurement unit 28 of the at least one lower stage 14 are independent of each other. Specifically, the first inertial measurement unit 22 collects missile data associated with the upper stage 12 independently from the second inertial measurement unit 28 collecting jettisoned stage flight data associated with the at least one jettisoned lower stage 14 during flight. In this way, the first inertial measurement unit 22 can continue to collect missile data associated with the upper stage 12 and the second inertial measurement unit 28 can continue to collect jettisoned stage flight data associated with the at least one jettisoned lower stage 14 after the at least one jettisoned lower stage 14 has been jettisoned and separated from the upper stage 12.

The first inertial measurement unit 22 may be a full capability inertial measurement unit while the second inertial measurement unit 28 may be a minimum capability inertial measurement unit. Stated differently, although the first inertial measurement unit 22 and the second inertial measurement unit 28 collect the same type of data, the outputs of the first inertial measurement unit 22 and the second inertial measurement unit 28 may have different accuracy requirements. Specifically, the first inertial measurement unit 22 of the upper stage 12 may be configured to collect data with higher accuracy and precision, and at a higher quality than the second inertial measurement unit 28. This is because the data collected by the first inertial measurement unit 22 is used by the primary flight computer 20 to guide and control the missile 10 along the entire missile flight path 18, with high enough precision to ensure that the missile 10, particularly the upper stage 12, reaches the predetermined target. The second inertial measurement unit 28 of the at least one lower stage 14 may be configured to collect data with lower accuracy and precision, and at a lower quality than the first inertial measurement unit 22. This is because the data collected by the second inertial measurement unit 28 is used by the secondary flight computer 24 to aerodynamically guide and control the at least one lower stage 14 along the jettisoned stage flight path 26 and requires only minimal precision and accuracy to ensure that the at least one lower stage 14 reaches the predetermined safe landing zone 30.

Similarly, the primary flight computer 20 may be a full capability flight computer while the secondary flight computer 24 may be a minimum capability flight computer. Specifically, the full capability primary flight computer 20 may is configured to receive data from various sensors, including but not limited to one or more global positioning systems (GPS), the first inertial measurement unit 22, and one or more seekers. The full capability primary flight computer 20 is configured to use such data in combination with pre-launch information about the target, such as an uploaded mission plan including the location of the predetermined target, to determine the correct missile flight path 18 that is required for the missile 10, particularly the upper stage 12, to reach the predetermined target. The full capability primary flight computer 20 is also configured to use such data to control the missile flight path 18, for example, by sending at least one guidance command to a control actuation system of the missile 10, as will be described below, or to control a rocket motor nozzle of the upper stage 12. The full capability primary flight computer 20 is configured to perform these functions over an entirety of the missile flight path 18, which typically encompasses a wide range of altitude and speed, with high precision and accuracy and at a quality high enough to ensure that the missile 10, particularly the upper stage 12, reaches the predetermined target.

In contrast, the secondary flight computer 24 may be of lesser quality and require less precise and accurate control than the full capability primary flight computer 20. Although the minimum capability secondary flight computer 24 is configured to perform similar functions to the full capability primary flight computer 20, the minimum capability secondary flight computer 24 is configured to receive data only from the second inertial measurement unit 28. Additionally, unlike the full capability primary flight computer 20, the minimum capability secondary flight computer 24 is configured to glide the at least one lower stage 14 along the jettisoned stage flight path 26 with minimal precision and accuracy and at a quality sufficient enough to ensure that the at least one jettisoned lower stage 14 glides aerodynamically to the predetermined safe landing zone 30. Since the predetermined safe landing zone 30 is typically larger than the predetermined target, high precision and accuracy is not necessarily required. Accordingly, the minimum capability secondary flight computer 24 may have significantly reduced performance requirements than the full capability primary flight computer 20.

The primary flight computer 20 and secondary flight computer 24 may each include, for example, software executed on a processor or other device, and/or hardware, such as a processor, field-programmable gate array (FPGA), integrated circuit, or the like. As used herein, software includes, but is not limited to, one or more computer or processor instructions that can be read, interpreted, compiled, and/or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software also may be implemented in a variety of executable or loadable forms including, but not limited to, a stand-alone program, a function call (local or remote), a servlet, and an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or computer-executable instructions can be located in one logic or distributed between two or more communicating, co-operating, or parallel processing logics and thus can be loaded or executed in series, parallel, massively parallel and/or other manners.

In addition, in other embodiments, the primary flight computer 20 and secondary flight computer 24 may be implemented in a hardware circuit(s) or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

The at least one lower stage 14 may include at least one moveable flight control surface 34 for both initially guiding the direction of the missile 10 before the at least one lower stage 14 has been jettisoned from the upper stage 12 and for guiding the direction of the at least one jettisoned lower stage 14 after the at least one lower stage 14 has been jettisoned from the upper stage 12. The at least one moveable flight control surface 34 may be, for example, at least one moveable fin. The at least one moveable fin may include a plurality of fins. In other embodiments, the at least one moveable flight control surface 34 may include canards, wings, ailerons, elevators, flaps, rudders and/or elevons.

The at least one lower stage 14 may further include a control actuation system 36 for controlling a position of the at least one movable flight control surface 34 according to at least one guidance command received by the primary and secondary flight computer 20, 24. The control actuation system 36 therefore has logic configured to receive the at least one guidance command from at least one of the primary flight computer 20 and the secondary flight computer 24 and, in response to receipt of the at least one guidance command, control a position of the at least one movable flight control surface 34.

Specifically, before the at least one lower stage 14 has been jettisoned from the upper stage 12, the logic of the control actuation system 36 is configured to receive at least one guidance command from the primary flight computer 20. The at least one guidance command from the primary flight computer 20 is determined by the primary flight computer 20 according to its desired control of the flight of the upper stage 12 along the missile flight path 18. The logic of the control actuation system 36 is then configured, in response to receipt of the at least one guidance command from the primary flight computer 20, to control a position of the at least one moveable flight control surface 34 to appropriately guide the upper stage 14 along the missile flight path 18.

Similarly, after the at least one lower stage 14 has been jettisoned from the upper stage 12, the logic of the control actuation system 36 is configured to receive at least one guidance command from the secondary flight computer 24. The at least one guidance command from the secondary flight computer 24 is determined by the secondary flight computer 24 according to its control of the flight of the at least one jettisoned lower stage 14 along the jettisoned stage flight path 26. The logic of the control actuation system 36 is then configured, in response to receipt of the at least one guidance command from the secondary flight computer 24, to control a position of the at least one moveable flight control surface 34 to appropriately aerodynamically glide the at least one jettisoned lower stage 14 along the jettisoned stage flight path 26.

Figure 3:
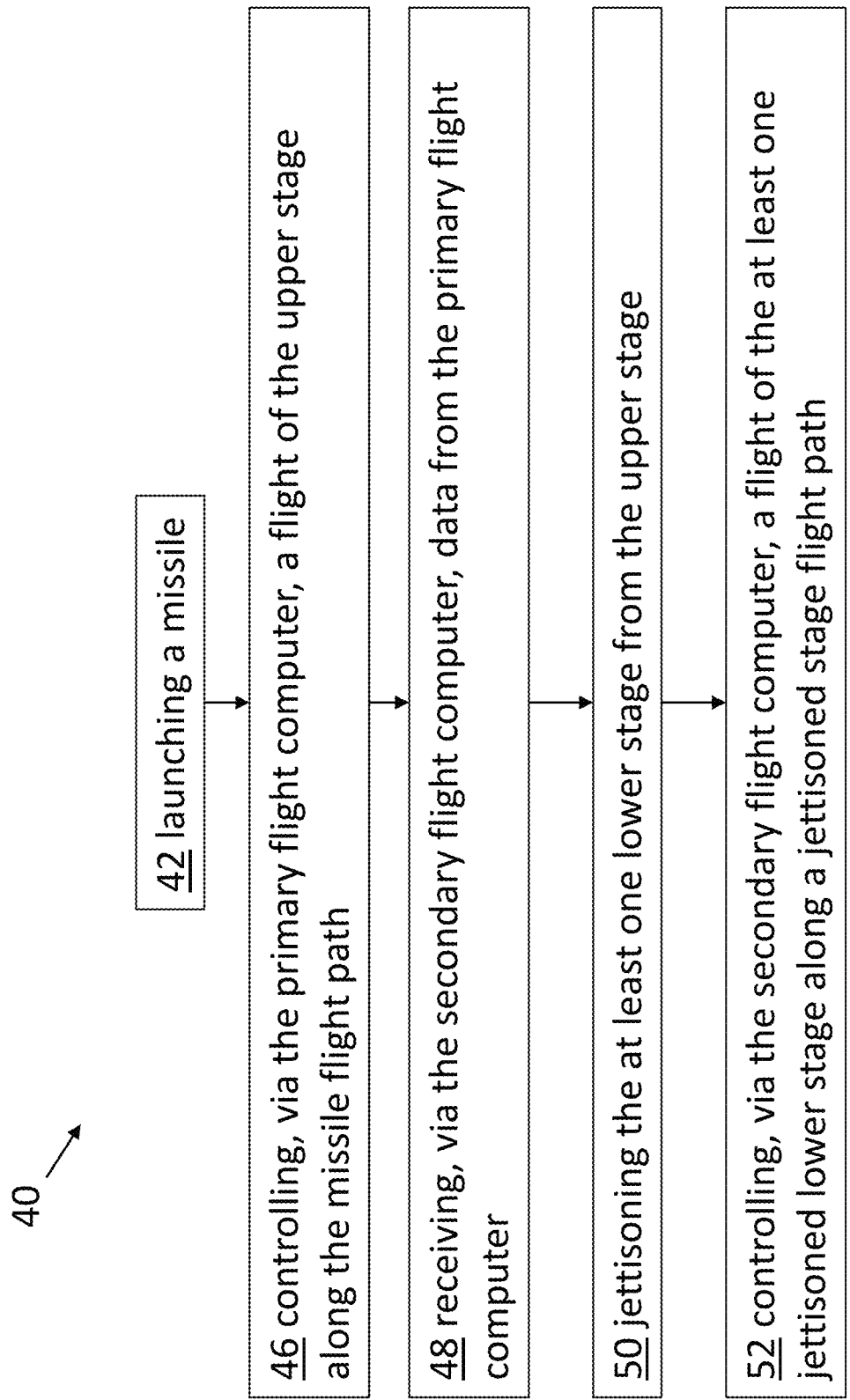
FIG. 3 is a flow chart diagram of a method of operating a multi-stage missile.

Now turning to FIG. 3, a method 40 of operating a missile, such as the multi-stage missile 10 described above, is described. The method 40 includes a first step 42 of launching the missile. The missile is configured to fly along a missile flight path to a predetermined target. The missile includes an upper stage having a primary flight computer, and at least one lower stage mounted to the upper stage and having a secondary flight computer. The at least one lower stage additionally includes a propellant. The method 40 includes the step of initially propelling, via the at least one lower stage with the propellant, the upper stage of the missile along at least a portion of the missile flight path. The method 40 also includes the step 46 of controlling, via the primary flight computer, the missile flight path such that, for example, the upper stage reaches the predetermined target.

The step of initially propelling the upper stage of the method may only last until the propellant of the at least one lower stage is spent. Therefore, the method 40 additionally includes the step 48 of receiving, via the secondary flight computer, data from the primary flight computer prior to the step 50 of jettisoning the at least one lower stage from the upper stage when, for example, the propellant of the at least one lower stage is spent. After the step of jettisoning, the method 40 then includes the step 52 of controlling, via the secondary flight computer, the flight of the at least one jettisoned lower stage along a jettisoned stage flight path of the at least one jettisoned lower stage such that, for example, the at least one jettisoned lower stage glides aerodynamically to a predetermined safe landing zone.

The method 40 may further include the step of collecting, via a first inertial measurement unit of the upper stage, missile flight data associated with the upper stage during flight and sending the missile flight data to the primary flight computer for controlling the flight of the upper stage along the missile flight path such that, for example, the upper stage reaches the predetermined target. The method 40 may additionally include the step of collecting, via a second inertial measurement unit of the at least one lower stage, jettisoned stage flight data associated with the at least one jettisoned lower stage during flight and sending the jettisoned stage flight data to the secondary flight computer for controlling the flight of the at least one jettisoned lower stage along the jettisoned stage flight path of the at least one jettisoned lower stage such that, for example, the at least one jettisoned lower stage glides aerodynamically to the predetermined safe landing zone.

In the method 40, the second inertial measurement unit may be independent of the first inertial measurement unit. Additionally, the second inertial measurement unit may be a minimum capability inertial measurement unit. The secondary flight computer is operably coupled to the primary flight computer and the secondary flight computer is a minimum capability flight computer.

The at least one lower stage may include at least one movable flight control surface, for example at least one fin, canard, wing, aileron, elevator, flap, rudder and/or elevon. The method 40 therefore may additionally include a step of receiving, via logic of a control actuation system of the at least one lower stage, at least one guidance command from at least one of the primary flight computer and the secondary flight computer. In response to receiving the at least one guidance command, the method 40 may additionally include a step of controlling, via the control actuation system of the at least one lower stage, a position of the at least one movable flight control surface.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A missile comprising:
    an upper stage including a primary flight computer configured to control a flight of the upper stage along a missile flight path; and
    at least one lower stage mounted to the upper stage for initially propelling the upper stage along at least a portion of the missile flight path, wherein the at least one lower stage is configured to be jettisoned from the upper stage, the at least one lower stage further including a secondary flight computer configured to receive data from the primary flight computer prior to being jettisoned, and to control a flight of the at least one jettisoned lower stage along a jettisoned stage flight path of the at least one jettisoned lower stage.

2. The missile according to claim 1, wherein the upper stage further includes a first inertial measurement unit configured to collect missile flight data associated with the upper stage during flight and send the missile flight data to the primary flight computer for controlling the flight of the upper stage along the missile flight path.

3. The missile according to claim 1, wherein the at least one lower stage further includes a second inertial measurement unit configured to collect jettisoned stage flight data associated with the at least one jettisoned lower stage during flight and send the jettisoned stage flight data to the secondary flight computer for controlling the flight of the at least one jettisoned lower stage along the jettisoned stage flight path of the at least one jettisoned lower stage.

4. The missile according to claim 3, wherein the second inertial measurement unit is independent of the first inertial measurement unit.

5. The missile according to claim 3, wherein the second inertial measurement unit is a minimum capability inertial measurement unit.

6. The missile according to claim 1, wherein the secondary flight computer is operably coupled to the primary flight computer.

7. The missile according to claim 1, wherein the secondary flight computer is a minimum capability flight computer.

8. The missile according to claim 1, wherein the at least one lower stage includes at least one movable flight control surface.

9. The missile according to claim 8, wherein the at least one lower stage further includes a control actuation system having logic configured to receive at least one guidance command from at least one of the primary flight computer and the secondary flight computer and, in response to receipt of the at least one guidance command, control a position of the at least one movable flight control surface.

10. The missile according to claim 8, wherein the at least one movable flight control surface is at least one fin.

11. The missile according to claim 1, wherein the at least one lower stage further includes a propellant and wherein the at least one lower stage is configured to be jettisoned from the upper stage when the propellant of the at least one lower stage is spent.

12. A method of operating a missile, the method comprising:
    launching the missile, the missile configured to fly along a missile flight path, the missile including an upper stage having a primary flight computer, and at least one lower stage having a secondary flight computer; said lower stage mounted to the upper stage or at least one lower stage;
    controlling, via the primary flight computer, a flight of the upper stage along the missile flight path;

receiving, via the secondary flight computer, data from the primary flight computer;

jettisoning the at least one lower stage from the upper stage; and controlling, via the secondary flight computer, a flight of the at least one jettisoned lower stage along a jettisoned stage flight path.

13. The method according to claim 12, further including collecting, via a first inertial measurement unit of the upper stage, missile flight data associated with the upper stage during flight and sending the missile flight data to the primary flight computer for controlling the flight of the upper stage along the missile flight path.

14. The method according to claim 12, further including collecting, via a second inertial measurement unit of the at least one lower stage, jettisoned stage flight data associated with the at least one jettisoned lower stage during flight and sending the jettisoned stage flight data to the secondary flight computer for controlling the flight of the at least one jettisoned lower stage along the jettisoned stage flight path of the at least one jettisoned lower stage.

15. The method according to claim 14, wherein the second inertial measurement unit is independent of the first inertial measurement unit.

16. The method according to claim 14, wherein the second inertial measurement unit is a minimum capability inertial measurement unit.

17. The method according to claim 12, wherein the secondary flight computer is operably coupled to the primary flight computer.

18. The method according to claim 12, wherein the secondary flight computer is a minimum capability flight computer.

19. The method according to claim 12, wherein the at least one lower stage includes at least one movable flight control surface.

20. The method according to claim 19, further comprising receiving, via logic of a control actuation system of the at least one lower stage, at least one guidance command from at least one of the primary flight computer and the secondary flight computer and, in response to receiving the at least one guidance command, controlling, via the control actuation system of the at least one lower stage, a position of the at least one movable flight control surface.

* * * * *